UNITED STATES PATENT OFFICE.

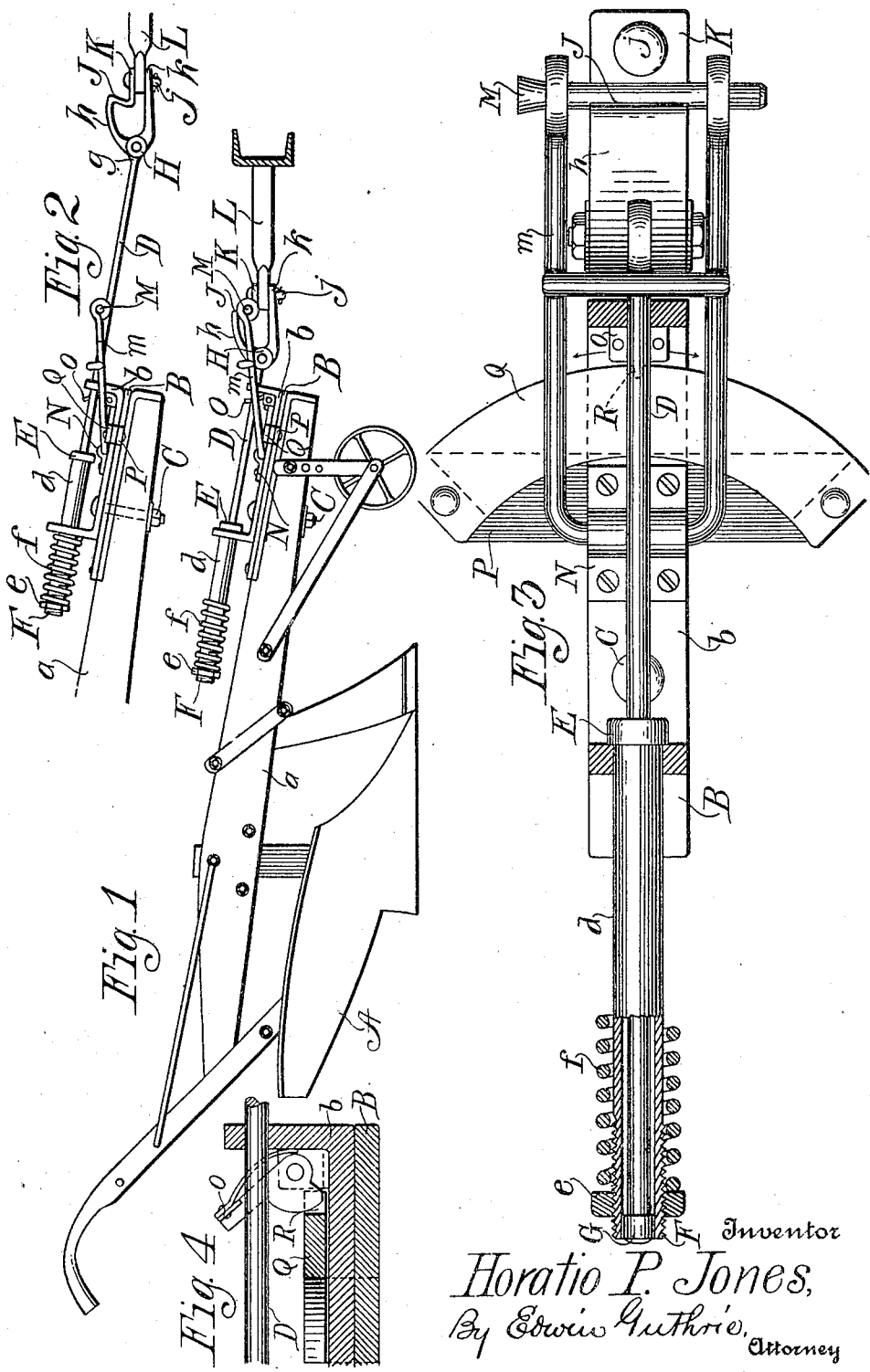

HORATIO P. JONES, OF DANVILLE, PENNSYLVANIA.

IMPLEMENT-HITCH.

1,326,271.  Specification of Letters Patent.  Patented Dec. 30, 1919.

Application filed June 19, 1919. Serial No. 305,369.

*To all whom it may concern:*

Be it known that I, HORATIO P. JONES, a citizen of the United States, residing at Danville, in the county of Montour and State of Pennsylvania, have invented certain new and useful Improvements in Implement-Hitches, of which the following is a specification.

The invention relates to implement hitches, more particularly to the coupling devices by which agricultural implements are connected with tractors for farm or other uses.

The object of this invention is the production of a tractor coupling that may be used not alone with farm implements, but with any vehicular or movable contrivance to which it is desired to attach the tractor for any purpose, the invention comprising parts of special construction and arrangement and adapted particularly for conveniently coupling the tractor with the object to be drawn by the tractor. Thus, this applicant recently bought a farm tractor, and in attaching it to a manure spreader met with a great deal of trouble and delay. In backing the tractor to connect with the spreader it was found to be exceedingly annoying and difficult to get the tractor in direct line with the tongue of the spreader, in fact this operation is so troublesome that one man unaided cannot ordinarily accomplish it. By the use of this invention it is not necessary to get the tractor in direct line with the implement to which one wants to attach it. This invention being secured to a plow beam as set out in this application, if the tractor is not in direct line the latch may be raised and the draw rod pulled out and turned to right or left and the clevis or connection raised or lowered so that the coupling with the drawbar of the tractor is easily made by one man. When attached, the tractor is driven straight ahead until the implement pulls straight, and then backed until the pin of the latch passes over the shoulder or hump on the clevis.

The accompanying drawings illustrate the construction and arrangement of the parts of this invention. Figure 1 represents a plow having this invention mounted upon the beam thereof. In this view the draw rod occupies its inner position, and the latch pin is shown in engagement with the shoulder of the clevis. Fig. 2 is a side view of the end portion of the plow beam with this invention mounted thereon, the draw rod being pulled out to the full extent preparatory to making a hitch with an implement. Fig. 3 is a top plan view of this invention detached, the scale of drawing being increased to render the form and disposition of the parts easier of inspection. Fig. 4 is a vertical section of the end of the saddle and base, showing the quadrant latch engaged. The same letter refers to the same part.

Considering the drawings, A is a plow having the beam *a*. Upon the end of the beam is a cap plate or shoe B, carrying a rider or saddle *b* having perpendicular ends and pivotally held in place by the kingbolt C.

Through the ends of the saddle the draw rod D passes movably lengthwise, one end, termed for the purposes of this description the inner end, has a telescopic engagement with the cylinder or tube *d* that passes movably through one of the perpendicular ends of the saddle. One end of the tube *d* is closed by the cap E through which the draw rod passes, and the other end of the tube carries the nut *e* engaging the threads F, and acting to retain the coil spring *f* on the tube.

As best illustrated in Fig. 3, the draw rod has the head G on its end within the tube *d*, and the other or outer end of the draw rod referred to by the letter *g* is pivotally joined to the clevis or connection H. This clevis comprises the curved or inclined surface *h*, and shoulder J, and a pin *j* passing through the jaws K and *k* of the clevis H couples the same with the drawbar L of a tractor.

As best shown in Figs. 1 and 3, the shoulder J of the clevis is engaged by a pin M that passes transversely through the end eyes of the U-shaped latch or bail *m*. The pin M in practice is a wooden pin and may be broken as stated in the explanation of the mode of operation. The end of the latch or bail is pivotally connected with the saddle by means of the retaining or keeper plate N.

In the operation of this invention, as has been stated, it is not necessary that the drawbar of the tractor shall be in direct line with the draw rod D. This rod may be pulled out and turned either to right or left upon the kingbolt C, and, the clevis itself may be turned up or down to conveniently meet the end of the drawbar L and admit the coupling pin *j*. The tractor being started straight ahead, it daws the implement into direct line with it, and the tractor is then backed until the pin M in the latch *m* slips along on the draw rod and rises over the inclined and usually curved surface *h* of the clevis by which it is guided into engagement with the shoulder J, as set out in Fig. 3. The engagement of the pin M and the shoulder J sustains the pull of the tractor by which the implement is drawn along. In plowing, when the plow strikes an obstruction the wooden pin M breaks allowing the draw rod to slide lengthwise through the tube *d* until the head G meets the inside of the cap E, then the tube also is drawn through the end of the saddle until the spring *f* strikes the perpendicular end of the saddle, and the draft or jerk of the tractor is cushioned by the spring without injury to the parts concerned. It is a matter of a few minutes only to put in a new pin of wood and to back the tractor until the new pin engages the shoulder J as previously explained. When this invention is employed for ordinary road uses, that is to say, when it is applied to a trailer or like vehicle, and no serious obstacles are likely to be encountered, the pin M may be replaced by a steel pin. The operation of coupling the tractor to the vehicle or trailer to be drawn is the same as before. It should also be explained that, when this invention is operated, and the saddle *b* is swung to the right or left, it is guided horizontally by the quadrant Q which is supported by the cross-piece P, the ends of which project from the sides of the base plate B. The quadrant is suitably spaced from the ends of the supporting cross-piece P so that the saddle may have freedom of movement below the quadrant. The quadrant also prevents the displacement of the saddle vertically. When the hitch is made and the tractor has been started thus pulling all parts into alinement as explained, a spring latch O carried by the saddle, as best set out in Fig. 4, engages a notch R in the edge of the quadrant and maintains the saddle and the parts borne by it in a central position.

Having now described this invention, and explained its mode of operation, what I claim is:—

1. In an implement hitch, the combination with a rider or saddle, of a draw rod movable lengthwise in the said saddle, a spring encircling the draw rod and arranged to strike the saddle and limit the longitudinal movement of the rod in the saddle, a clevis attached to the end of the rod and having a shoulder, and means pivotally attached to the saddle and movable into engagement with the said shoulder of the clevis.

2. In an implement hitch, the combination with a rider or saddle, of a draw rod movable lengthwise in the said saddle, a spring encircling the rod and arranged to strike the said saddle and limit the longitudinal movement of the rod in the saddle, a clevis attached to the end of the rod and having a shoulder, and means pivotally attached to the saddle and having a breakable member arranged to engage the shoulder of the said saddle.

3. In an implement hitch, the combination with a rider or saddle, of a draw rod movable lengthwise in the said saddle, a spring encircling the draw rod and arranged to strike the saddle and limit the longitudinal movement of the rod in the saddle, a clevis attached to the end of the rod and having a shoulder, and a U-shaped latching bail pivotally attached to the saddle and having a breakable pin connecting the ends of said bail and arranged to engage the said shoulder of the clevis.

4. In an implement hitch, the combination with a support, of a draw rod mounted upon the support and movable lengthwise, means including a resilient member arranged to limit the lengthwise movement of the rod, the said rod having a portion provided with a shoulder, and devices attached to the support and movable into engagement with the said shoulder of the draw rod.

5. In an implement hitch, the combination with a support, of a draw rod mounted upon the support and movable lengthwise, means including a resilient member arranged to limit the lengthwise movement of the rod, the said rod having a portion provided with a shoulder, and devices attached to the support and including a breakable member movable into engagement with the said shoulder of the draw rod.

6. In an implement hitch, the combination with a draw rod, of a support for the rod having one end pivoted, means for guiding the said support in a horizontal direction, latching devices for securing the said support in its middle position, resilient means for limiting the longitudinal movement of the said rod, the said rod having a portion provided with a shoulder, and means pivotally attached to the said support and having a member movable into engagement with the said shoulder of the rod.

In testimony whereof I affix my signature.

HORATIO P. JONES.